United States Patent
Hansen et al.

[11] Patent Number: 5,910,890
[45] Date of Patent: Jun. 8, 1999

[54] CIRCUIT FOR CONTROLLING APPLICATION OF ELECTRICITY TO A COIL OF AND ELECTRIC CURRENT SWITCHING APPARATUS

[75] Inventors: James E. Hansen, Oak Creek; Michael E. Bauer, Wauwatosa; Dale L. Gass, Brown Deer; William J. Janutka, West Allis, all of Wis.

[73] Assignee: Eaton Corporation, Cleveland, Ohio

[21] Appl. No.: 09/024,373

[22] Filed: Feb. 12, 1998

[51] Int. Cl.⁶ .............................. H02M 1/12; H01H 9/00
[52] U.S. Cl. ............................................. 363/41; 361/154
[58] Field of Search ............................ 363/41; 361/154, 361/194

[56] References Cited

U.S. PATENT DOCUMENTS

| | | | |
|---|---|---|---|
| 4,274,122 | 6/1981 | Hansen et al. | 361/159 |
| 4,516,185 | 5/1985 | Culligan et al. | 361/154 |
| 4,885,658 | 12/1989 | Büchl | 361/154 |
| 5,055,961 | 10/1991 | Wiblin et al. | 361/154 |
| 5,347,419 | 9/1994 | Caron et al. | 323/282 |
| 5,531,198 | 7/1996 | Matsuura | 123/294 |
| 5,574,617 | 11/1996 | Shimanuki et al. | 361/154 |
| 5,737,172 | 4/1998 | Ohtsuka | 361/154 |
| 5,818,678 | 10/1998 | Berg et al. | 361/154 |

*Primary Examiner*—Stuart N. Hecker
*Attorney, Agent, or Firm*—Quarles & Brady

[57] ABSTRACT

A control circuit drives the coil of a contactor in response to a control voltage being applied. The control circuit includes a power supply that produces a regulated output voltage from the control voltage. The onset of the regulated output voltage starts a timer which controls the width of pulses produced by a PWM controller. The pulses control a transistor that applies the control voltage to the coil. Initially the pulses cause a high current to flow through the coil to close the contactor and after an interval of time the timer signals the PWM controller to shorten the pulses which applies lesser current to the coil to keep the contacts closed. A flyback circuit provides a relatively low reverse voltage drop path in parallel with the coil to maintain the electromagnetic field during the periods between the pulses. When the control voltage is removed to open the contactor, the flyback circuit provides a high reverse voltage drop path to promptly dampen the coil current.

15 Claims, 2 Drawing Sheets

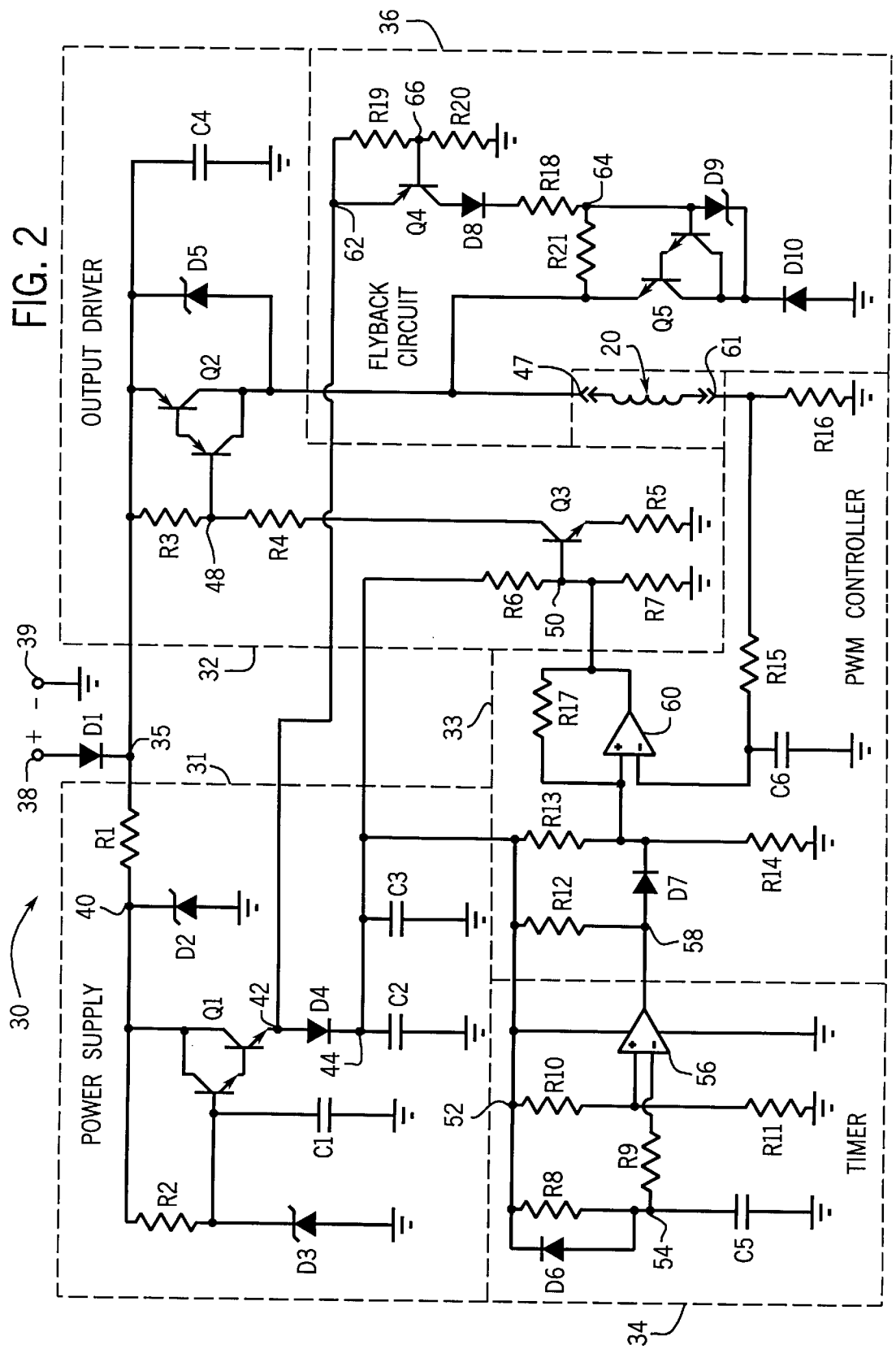

CIRCUIT FOR CONTROLLING APPLICATION OF ELECTRICITY TO A COIL OF AND ELECTRIC CURRENT SWITCHING APPARATUS

BACKGROUND OF THE INVENTION

This invention relates to apparatus, such as contactors, for switching electric current; and more particularly to a control circuit for applying electricity to a coil in the apparatus to open and close a set of switch contacts.

The application of electricity to motors and other large loads often is controlled by type of relay known as a contractor. The contactor has one or more sets of electrical switch contacts which typically are spring biased into an open state. When a solenoid coil of the contactor is energized, an electromagnetic field is produced which forces the switch contacts closed. Thus the contactor enables a relatively small current and voltage applied to the coil to switch a much larger current and/or voltage to the load.

With some types of contactors a greater current is required to initially close the contacts than is required thereafter to maintain the contacts in the closed state. As a consequence in some applications, such as battery powered equipment, it is desirable to reduce the coil current after the contacts close in order to conserve power. One technique for controlling the current is to pulse width modulate the electricity applied to the contactor coil and vary the duration of the pulses to alter the magnitude of the current applied to the coil.

With pulse width modulation, the energy stored in the coil can be employed to produce "flyback" current during the off period of each pulse cycle in order to maintain the electromagnetic field that keeps the contacts closed. Thus a low impedance feedback path is established around the coil for this flyback current. However that low impedance feedback path has the drawback of slowing the decay of the electromagnetic field when the contacts are to open. This slows the physical separation of the contacts and increases arcing conditions between the separating contacts.

In addition, external devices, such as transient suppressors, connected across the coil terminals of conventional contactors also may adversely affect the speed at which the contacts open to turn off the load.

SUMMARY OF THE INVENTION

A general object of the present invention is to provide a control circuit for an electromagnetically operated current switching apparatus which circuit provides rapid decay of the coil magnetic field during load turn-off.

A further object of the present invention is to provide a pulse width modulation control circuit for the coil of the switching device, which provides a relatively low power dissipation path across the coil while the control circuit is powered and a high dissipation path when the load is to be turned off.

Another object is to provide a control circuit which minimizes the affects on coil operation due to external devices connected to the coil terminals.

These and other objectives are satisfied by a control circuit for an electrical switching device which has a set of contacts which are operated by an electromagnetic coil. The control circuit includes first and second input terminals to receive a control signal for operating the electrical switching device. A first transistor has a conduction path connected in series with the electromagnetic coil between the first and second control terminals. A controller applies a series of electrical pulses to a control terminal of the first transistor to switch that transistor into a conductive state and apply current pulses to the coil. The series of pulses has a first duty cycle during a predefined period of time following application of the control signal to the first and second input terminals, and thereafter the series of pulses has a second duty cycle which results in less current flowing through the electromagnetic coil than flowed during the predefined period of time.

A flyback circuit has a first diode and a second transistor connected in series to provide a conductive path in parallel with the electromagnetic coil for current produced in the electromagnetic coil when the first transistor is non-conductive. The second transistor is biased into a first conductive state by the control signal. Upon removal of the control signal from the first and second input terminals, the second transistor is biased into a second conductive state by current produced in the electromagnetic coil with the second conductive state being less conductive than the first conductive state. Thus the first conductive state acts to maintain an electromagnetic field produced by the coil between occurrences of the electrical pulses. The second conductive state produces a voltage drop in the path for current produced in the electromagnetic coil when it is desired to deactivate the switching device. This action dissipates significant power to rapidly deplete the coil stored magnetic field which results in rapid opening of the switch contacts.

BRIEF DESCRIPTION OF THE DRAWINGS

FIG. 2 is a schematic circuit diagram of an embodiment of a control circuit according to the present invention.

DETAILED DESCRIPTION OF THE INVENTION

Figure 1:
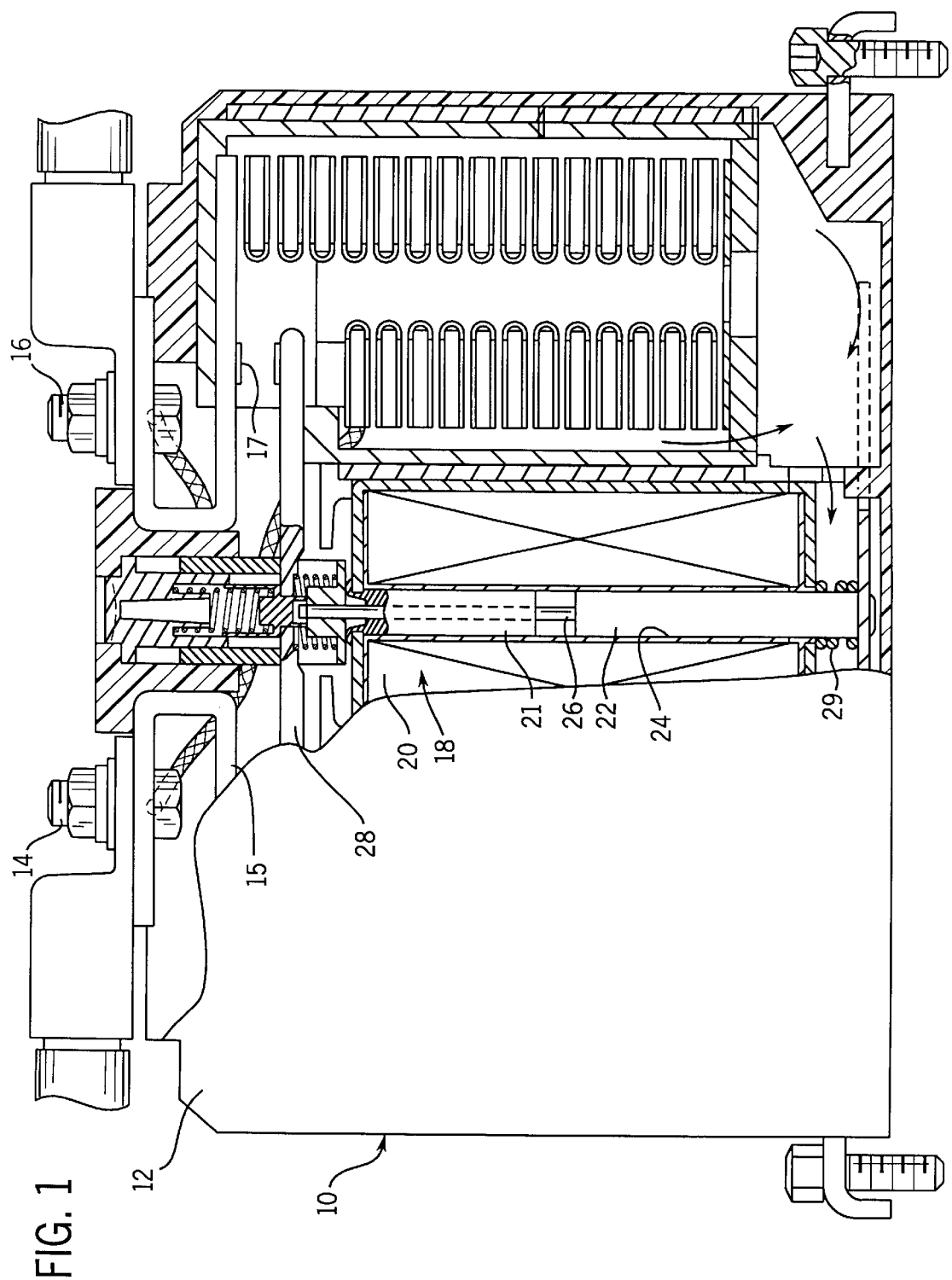
FIG. 1 is a partial cut-away view of a electrical contactor with which the present invention can be used.

With reference to FIG. 1, an electromagnetic single pole contactor 10 has a plastic housing 12 with first and second power terminals 14 and 16. The first power terminal 14 is connected to a first stationary contact 15 attached to the housing and the second power terminal 16 is connected to a second stationary contact 17.

An electromagnetic solenoid 18 nests in recesses in the interior surfaces of the housing 12. The solenoid 18 has an annular coil 20 with a core 21 and an armature 22 located within the central opening 24 of the coil. The armature 22 includes a shaft 26 that freely passes through the core 21 and connects to a moveable contact arm 28.

When the coil 20 is energized with electric current, the armature 22 moves upward, in the orientation shown in FIG. 1, which action forces the moveable contact arm 28 against the two stationary contacts 15 and 17 to complete an electric path between the first and second power terminals 14 and 16. When current is removed from the coil 20, a spring 29 forces the moveable contact arm 28 away from the two stationary contacts 15 and 17, opening the electrical path. A contactor of this type is described in U.S. Pat. No. 5,004,874 which description is incorporated herein by reference.

Within the contactor housing 12 is an electrical circuit 30, shown in FIG. 2, which controls the application of electricity to the coil 20. The user activates and deactivates the contactor 10 by applying and removing DC voltage across coil control terminals 38 and 39. When activated, the control circuit 30 applies a series of direct current pulses to the coil in order to close the contacts of the switching device 10. The amount of current that has to be applied to the coil 20 to move contact arm 28 against the stationary contacts 15 and 17 is greater than the magnitude of the current that is required thereafter to maintain the electrical path through the contacts. As a consequence, the control circuit 30 applies pulses with relatively large duty cycles in order to apply sufficient current through the coil 20 to close the contacts. After a predefined period of time that is long enough to ensure contact closure, the control circuit reduces the duty cycle and hence the coil current to a lower level that is just sufficient to hold the movable contact arm 28 against stationary contacts 15 and 17.

The control circuit 30 comprises a power supply section 31, an output driver section 32, a pulse width modulation (PWM) current controller 33, a timer 34, and a flyback/decay circuit 36. The power supply 31 provides stable, regulated voltage to the timer 34 and PWM current controller 33 over a wide range of input voltages (for example 10 vdc to 50 vdc). The positive control terminal 38 is coupled to the power supply input node 40 by diode D1, node 35 and a current limiting resistor R1. Zener diode D2 extends between input node 40 and ground to provide over-voltage protection of the power supply. Resistor R2 and Zener diode D3 are connected in series between the input node 40 and ground. The Zener diode D3 is the primary voltage reference element producing at its cathode a nominal 8.4 volts with respect to ground, which is fed to the base of an NPN Darlington transistor Q1. Capacitor C1 couples the base of transistor Q1 to ground as a noise filter and also to slow the rate of voltage rise at the base during power-up. This reduces the instantaneous turn on drive current into capacitors C2 and C3 reducing stress on those capacitors, as well as on Transistor Q1. The Darlington transistor Q1 has a collector connected to the input node 40 and an emitter coupled to a first output node 42 of the power supply. Transistor Q1 acts as an emitter-follower current amplifier to provide regulated output voltage of nominally 7.2 vdc over a range of current loads and throughout a wide input voltage range.

The first output node 42 of the power supply 31 is connected by a decoupling diode D4 to a second output node 44 of the power supply 31. The second output node 44 is coupled to ground by capacitors C2 and C3 connected in parallel. The decoupling diode D4 feeds the regulated voltage to voltage comparators in the timer 34 and PWM current controller 33. Capacitor C2 acts as a filter element to maintain voltage during brief input power interruptions and negative transients. A much smaller capacitor C3 is in parallel with capacitor C2 to provide more effective high frequency noise suppression. During turn-off of the contactor 10, diode D4 prevents reverse current from capacitor C2 from flowing back to the first output node 42 and into other circuit stages which must slew quickly to zero. Such a current loop could adversely affect the operation of the flyback/decay circuit 36.

The timer 34 controls the duration of time that the control circuit 30 delivers the high level pull-in current to the coil 20 to initially actuate the contactor 10. A timer input node 52 is connected directly to the second output node 44 of the power supply 31. Diode D6 and resistor R8 are connected in parallel between the timer input node 52 and an intermediate node 54 which is coupled by capacitor C5 to ground. The intermediate node 54 is connected by resistor R9 to the inverting input of a first voltage comparator 56. The non-inverting input of the first voltage comparator 56 is connected to the intermediate node of a voltage divider formed by resistors R10 and R11 connected in series between the timer input node 52 and ground to form a reference voltage source.

The output of the first voltage comparator 56 is connected to the input terminal 58 of the PWM current controller 33. The input terminal 58 is connected by a pull-up resistor R12 to the second output 44 from the power supply 31. Since the comparator output stage is an open collector type resistor R12 becomes a current source into the cathode of diode D7 when the collector is off. Blocking diode D7 couples the input terminal 58 to the non-inverting input of a second voltage comparator 60. That non-inverting input also is connected by bias resistor R13 to the second output 44 of the power supply and to ground by resistor R14, thereby forming a reference voltage source. Resistor R17 is connected between the output of the second voltage comparator 60 and the non-inverting input to provide hysteresis for the comparator ON-OFF threshold. The inverting input of the second voltage comparator 60 is connected by resistor R15 to the second end 61 of the contactor coil 20 which end is connected to ground by a low resistance current sensing resistor R16. The inverting input of the second voltage comparator 60 is also coupled to ground by capacitor C6. The output of the second voltage comparator 60 is connected to the base of an NPN transistor Q3 in the output driver 32.

The base of transistor Q3 is connected to the intermediate node 50 of another voltage divider formed by resistors R6 and R7 that are connected in series between the second output node 44 of the power supply and ground. The output driver 32 has a second Darlington transistor Q2, here a PNP type with an emitter connected to the input node 35 and a collector connected to a first end 47 of the contactor coil 20. A Zener diode D5 is connected across the emitter-collector junction of Darlington transistor Q2 to provide overvoltage and transient protection and a capacitor C4 couples the emitter to ground for noise suppression. A voltage divider formed by resistors R3 and R4 has one end connected to input node 35 and an intermediate node 48 connected to the base of transistor Q2. The other end of the R3/R4 voltage divider is connected to ground by the series connection of the collector-emitter path of transistor Q3 and resistor R5. Actually when transistor Q3 is in an ON state it operates in a current limiting mode. When its emitter current reaches a level that the voltage drops across resistor R5 approaches the level established at the base terminal by resistor divider R6 and R7 (minus the Vbe drop), base bias self limits itself and the collector to emitter voltage drop adjusts to keep current at this level. This effect is desirable since the current drawn through resistor R4 to drive the base of transistor Q2 is constant no matter what the supply voltage is at input 38.

The flyback/decay circuit 36 has an input node 62 connected to the first output node 42 of the power supply 31. The input node 62 is connected by the emitter-collector conduction path of PNP transistor Q4, diode D8 and resistor R18 to an intermediate node 64. A voltage divider formed by resistors R19 and R20 is connected between the input node 62 and ground with an intermediate node 66 connected to the base of transistor Q4. Intermediate node 64 of the flyback/decay circuit 36 is connected to the base of Darlington transistor Q5 with its emitter connected to the first end of the contactor coil 20 and coupled by resistor R21 to its base. The collector of transistor Q5 is connected by reverse biased diode D10 to ground and to its base by Zener diode D9.

When the control circuit 30 is powered-up by applying voltage to control terminals 38 and 39, the voltage across capacitor C5 in the timer 34 is initially at a zero level, which is coupled through R9 into the inverting input of the first voltage comparator 56. This results in the output of the first voltage comparator 56 being open, thereby allowing resistor R12 to pull node 58 to the regulated supply voltage. Under these conditions the low side of R12 at node 58 is steered through diode D7 into the R13/R14 voltage divider of the second voltage comparator 60 in PWM current controller 33. This biases the reference input of that comparator 60 to a high level. With the comparators 60 in a high output state, resistor R17 tends to pull the reference level up slightly and the high output state also turns on transistors Q3 and Q2. These transistors remain conductive until the voltage across the current sensing resistor R16 exceeds the reference voltage applied to the non-inverting input of the second voltage comparator 60 at which time the output of the comparator goes low. This action pulls one end of R17 low which reduces the reference level at the non inverting input of comparator 60. This positive feedback around the comparator assures positive and rapid switching of the comparator. With the output of comparator 60 low the transistors Q3 and Q2 turn off. Transistors Q3 and Q2 turn-on again once the voltage across the current sensing resistor R16 drops below the reference voltage to the second voltage comparator 60. Resistor R17 is selected to provide a small amount of voltage hysteresis to the toggle threshold reference on the comparator input. This differential establishes a slight difference in the current sense levels where the comparator toggles on and off. The level differences, in conjunction with the L/R ratio of the coil and the time constant of Resistor R15 and capacitor C6 determine the actual operating frequency of the PWM oscillation behavior and the amount of ripple in the regulated current. Because the reference voltage produced by the timer 34 at the non-inverting input to second voltage comparator 60 during this initial phase of circuit operation is relatively high, the width of the current pulses applied to the coil 20 are relatively long resulting in a large initial coil current.

Over time, capacitor C5 charges up through resistor R8. When the capacitor voltage attains the level at the non-inverting input of the first voltage comparator 56, that latter device's output toggles low diverting current from R12 to ground negating the influence of resistor R12 on the R13/R14 voltage divider. This action removes the contact closing bias level on the non-inverting input of the second voltage comparator 60 causing the current applied to coil 20 to reduce to the lower level, now only determined by the R13/R14 voltage divider, which level is required to keep the contacts 15, 17 and 28 closed. Specifically, a lower reference voltage now is applied to the non-inverting input of the second voltage comparator, which shortens the current pulses applied to the coil 20 by the switching action of transistors Q3 and Q2. This steady state condition will be sustained until the control circuit 30 is turned off by removing the positive voltage from positive control terminal 38.

During turn-off of the control circuit 30, the voltage across the main power supply capacitors C2 and C3 decays quickly due to circuit loading. To ensure that timing capacitor C5 discharges rapidly, reverse diode D6 is included across resistor R8 and becomes forward biased when the supply voltage decays below the charged level of C5. Thus the circuit "resets" itself rapidly during turn-off, permitting proper turn-on timing to re-occur if power is reapplied shortly after turn-off. Such a situation would occur when a motor is controlled by the contactor 10 being rapidly "jogged" on and off.

Current through the coil circuit 30 is regulated by rapidly switching (pulsing) output transistor Q2 on and off, and by varying the ratio of on to off time, thereby pulse width modulating (PWM) the coil current. The coil current is precisely sensed and controlled both during contact pull-in and closure phases, with the ratio continuously adjusted to compensate for changes in supply voltage and coil resistance variations.

Smooth coil current flow is accomplished during the brief PWM "off" intervals between current pulses by providing a flyback loop around the coil 20 through diode D10. During normal operation, diode D10 is held in a low impedance loop around the coil by having transistor Q5 biased fully conductive by the power supply 31. This is accomplished by feeding regulated voltage from power supply node 42 through transistor Q4, diode D8, and resistor R18 into the base of transistor Q5. During the PWM off interval between pulses, the coil polarity reverses in an attempt to keep current flowing in the same direction as it was flowing during the on interval, according to Lenz's Law. Thus diode D10 and transistor Q5 are forward biased and conduct flyback current around the coil 20.

When the control circuit 30 is turned off, however, it is essential that this flyback loop dissipate the stored coil energy rapidly so that the contactor opening motion is not dampened or slowed down. When voltage is removed from positive control terminal 38, the base bias into transistor Q5 from transistor Q4, diode D8 and resistor R18 is removed, which tends to turn off transistor Q5 and open the flyback loop. However, the reverse polarity generated by the coil now biases the base of transistor Q5 through Zener diode D9, forcing that transistor's collector to emitter voltage to clamp at this level. This voltage drop, in conjunction with the flyback current, produces significant power consequently dissipating the coil field rapidly which allows the contactor to open quickly. Therefore, the flyback circuit 36 provides a dual function, a low impedance flyback loop during normal PWM operation, and a power dissipator during turn-off.

During this turn-off interval, transistor Q4 assures that no leakage paths exist to unintentionally provide a forward bias into the base of transistor Q5. Since the coil polarity is reversed during this time, the emitter of transistor Q5 is forced negative with respect to ground, and any path from ground to the positive control terminal 38 could provide a forward bias through transistors Q1 and Q4, resistor R18 and diode D8 to the base of transistor Q5, holding it on, and overriding the clamping voltage bias from diode D9. During that situation, however, the base of transistor Q4 would be biased off, opening its collector circuit and assuring that the loop to the base of transistor Q5 is open. Diode D4 also prevents power supply capacitors C2 and C3 from discharging back through transistor Q4 into the base of transistor Q5 during turn off, as the bias from these components could otherwise keep transistor Q4 on.

An important benefit of the present flyback/decay circuit 36 is that the coil 20 is provided with a controlled flyback decay loop. Ordinarily, a contactor coil is connected directly across control terminals 38 and 39, whereby control power is switched on and off to energize the coil. When the control line is switched off, the coil energy is typically dissipated quickly in the arcing of the switch. If some other load is also connected across this input, i.e. in parallel with the coil, the coil energy during turn-off may be dissipated more slowly in the form of a flyback current through that other load. A common, though undesirable practice when installing contactors in applications is to add a diode across the coil terminals to suppress any reverse voltage transients the coil might impress back onto the control line. The prolonged decay can dampen mechanical motion, slowing down contact separation, increasing arc duration resulting in increased contact damage and prolonging the time from maximum arc voltage buildup to current interruption. At higher voltage DC levels thus can become particularly crucial. With this circuit, the coil flyback energy is dissipated in an internal controlled loop, and is therefore not fed directly back through the input terminals where such external loads might affect it.

Furthermore, the present circuit isolates the transient coil voltages from being applied back onto the user's control lines connected to terminals 38 and 39, thereby eliminating the need for suppressors discussed previously.

We claim:

1. A control circuit for an electrical switching device having a set of contacts which are operated by a electromagnetic coil, said control circuit comprising:

first and second input terminals to receive a control signal for operating the electrical switching device;

a first transistor having a conduction path connected in series with the electromagnetic coil between the first and second control terminals, the first transistor having a control terminal;

a controller which generates a series of pulses that are applied to the control terminal of the first transistor, wherein the series of pulses biases the first transistor to apply a first level of current to the electromagnetic coil during a defined period of time and thereafter the first transistor is biased to apply a second level of current to the electrocmagnetic coil, where the first level is greater than the second level; and a flyback/decay circuit having a first diode and a second transistor connected in series and to the electromagnetic coil wherein the second transistor is biased by the control signal to provide a first voltage drop for current produced by the electromagnetic coil during intervals between each pulse of the series of pulses, upon removal of the control signal the second transistor is biased to provide a second voltage drop for current produced in the electromagnetic coil, in which the second voltage drop is greater than the first voltage drop.

2. The control circuit as recited in claim 1 wherein the defined period of time commences upon application of the control signal to the first and second input terminals.

3. The control circuit as recited in claim 1 wherein the series of pulses has a first duty cycle during the defined period of time and has a second duty cycle after the defined period of time.

4. The control circuit as recited in claim 3 wherein the controller varies the first and second duty cycles to provide predefined first and second current levels, respectively, regardless of changes in voltage of the control signal and changes in resistance of the electromagnetic coil.

5. The control circuit as recited in claim 3 wherein the controller comprises:

a timer that responds to the control signal by producing a timing signal after the defined period of time; and a pulse width modulation controller which produces the series of pulses with the duration of each pulse being responsive to the timing signal.

6. The control circuit as recited in claim 5 wherein the timer comprises:

a source of a reference voltage;

a resistor-capacitor network which produces a time varying voltage in response to control signal; and a comparator which produces the timing signal in response to the time varying voltage having a predefined relationship to the reference voltage.

7. The control circuit as recited in claim 5 wherein the pulse width modulation controller comprises:

a source of a reference voltage which varies in response to the timing signal;

a current sensor which produces a sensor voltage that indicates a magnitude of current flowing through the electromagnetic coil; and a comparator which produces the series of pulses in response to the sensor voltage having a predefined relationship to the reference voltage.

8. The control circuit as recited in claim 1 wherein the flyback circuit comprises a third transistor which is rendered conductive by application of the control signal and when rendered conductive biases the second transistor into the first conductive state.

9. The control circuit as recited in claim 1 wherein the flyback circuit drives the second transistor into saturation to produce the first voltage drop.

10. The control circuit as recited in claim 1 wherein the second transistor produces a fixed the second voltage drop.

11. The control circuit as recited in claim 1 wherein the flyback circuit comprises:

an input node coupled to the first input terminal;

a pair of resistors connected in series between the input node and the second input terminal, and forming a first node between the pair of resistors;

a third transistor having a conduction path and a control terminal coupled to the first node;

a second diode;

a first resistor wherein the conduction path of the third transistor, the second diode and the first resistor are connected in series between the input node and a control electrode of the second transistor;

a second resistor connected between the control electrode and one end of a conduction path of the second transistor which one end is coupled to one side of the electromagnetic coil; and a Zener diode connected between the control electrode and another end of a conduction path of the second transistor which other one end is coupled to another side of the electromagnetic coil.

12. The control circuit as recited in claim 1 further comprising a power supply connected to the first and second input terminals, and producing a regulated output voltage that is applied to the controller and to flyback circuit to bias the second transistor into the first conductive state.

13. A control circuit for an electrical switching device having a set of contacts which are operated in by a electromagnetic coil, said control circuit comprising:

first and second input terminals to receive a control signal for operating the electrical switching device;

a power supply connected to the first and second input terminals and producing a regulated output voltage;

a first transistor having a conduction path connected in series with the electromagnetic coil between the first and second control terminals, the first transistor having a control terminal;

a timer which has a first state for a defined period of time commencing upon application of the control signal to the first and second input terminals and has a second state after the defined period of time;

a pulse width modulator connected to the timer and comprising a source of a first reference voltage derived from the regulated output voltage wherein the first reference voltage is greater during the first state than during the second state of the timer, the pulse width modulator having a current sensor which produces a sensor voltage in response to a magnitude of current flowing through the electromagnetic coil, and a comparator which produces a bias pulse that is applied to the control terminal to render the first transistor conductive whenever the first reference voltage exceeds the sensor voltage; and a flyback/decay circuit having a conduction path connected in parallel with the electromagnetic coil, the conduction path formed by a first diode and a second transistor connected in series, wherein the second transistor is biased by the regulated output voltage to provide a first voltage drop for current produced in the electromagnetic coil, and upon removal of the control signal from the first and second input terminals the second transistor is biased, to provide a second voltage drop wherein the second voltage drop is greater than the first voltage drop.

14. The control circuit as recited in claim 13 wherein the flyback circuit further comprises:

an input node at which the regulated output voltage is received;

a pair of resistors connected in series between the input node and the second input terminal, and forming a first node between the pair of resistors;

a third transistor having a control terminal coupled to the first node, and having a conduction path;

a second diode;

a first resistor, wherein the conduction path of the third transistor, the second diode and the first resistor are connected in series between the input node and a control electrode of the second transistor;

a second resistor connected between the control electrode and one end of a conduction path of the second transistor which one end is coupled to one side of the electromagnetic coil; and a Zener diode connected between the control electrode and another end of a conduction path of the second transistor which other one end is coupled to another side of the electromagnetic coil.

15. The control circuit as recited in claim 13 wherein the timer comprises:

a voltage divider which produces a second reference voltage from the regulated output voltage;

a capacitor which is charged from the regulated output voltage to produce a time varying voltage;

and a comparator which produces a timing signal that changes states in response to the time varying voltage exceeding the second reference voltage.

\* \* \* \* \*